May 22, 1928.
J. E. MAHIN
GASKET CUTTER
Filed March 24, 1926
1,670,628
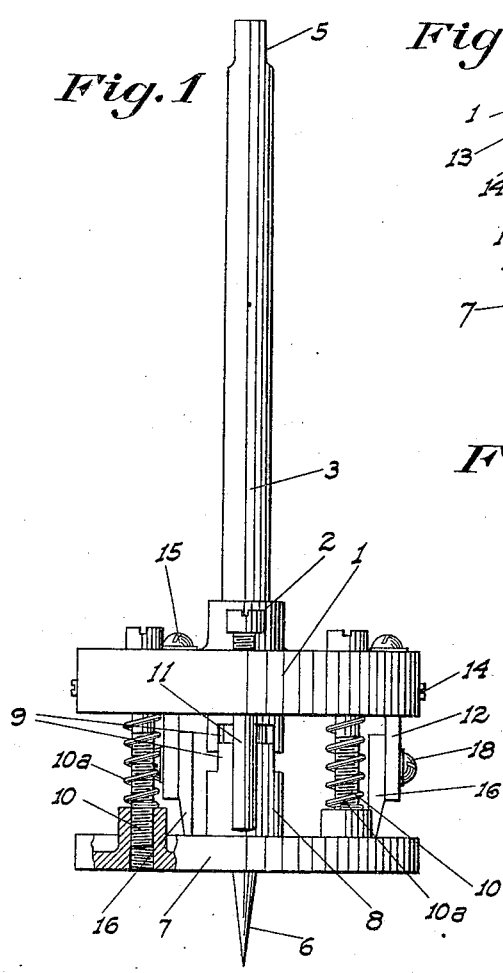
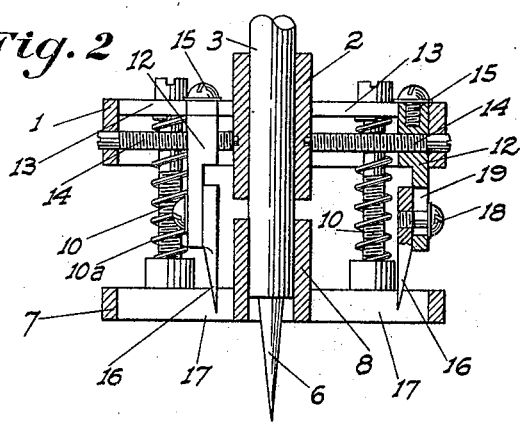
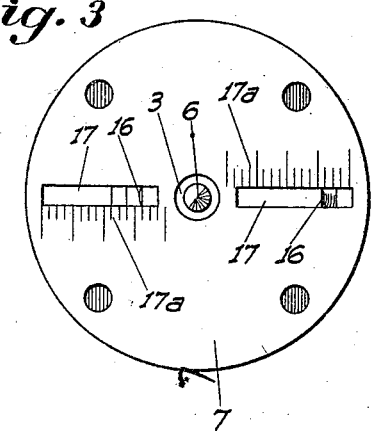
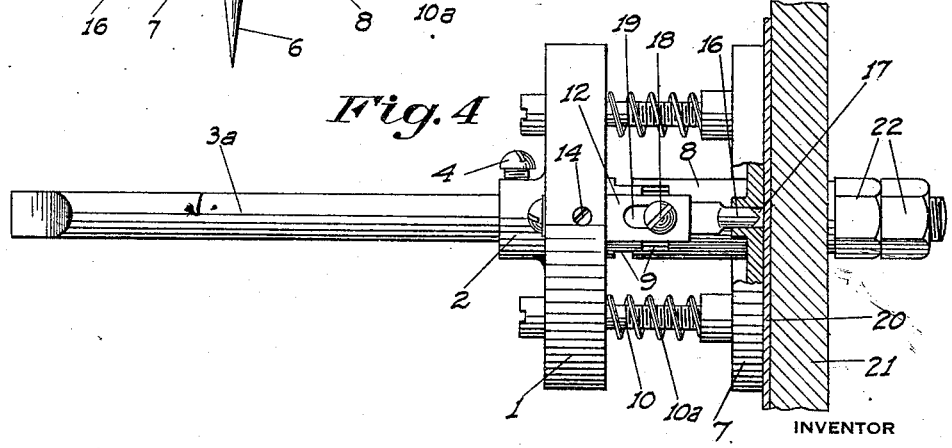
INVENTOR
J. E. Mahin
BY
ATTORNEY Patented May 22, 1928.

1,670,628

UNITED STATES PATENT OFFICE.

JAMES E. MAHIN, OF STOCKTON, CALIFORNIA.

GASKET CUTTER.

Application filed March 24, 1926. Serial No. 96,934.

This invention relates to improvements for cutting gaskets and the like, my principal object being to provide an implement for the purpose so constructed that ring gaskets or washers may be quickly and easily cut from any material and to a considerable thickness; as well as cutting circular orifices in any material when the purpose is to provide an orifice rather than to shape and keep the piece cut out from the material.

Another object of the invention is to provide a device of this character having a pair of cutters so arranged that they may be easily and independently adjusted to cut to different diameters, both externally and internally of a gasket, as well as to different depths; and when desired either cutter may be rendered inoperative without actually removing the same from the device. The cutters may also be readily removed or replaced when desired.

A further object of the invention is to produce a simple and inexpensive device and yet one which will be exceedingly effective for the purpose for which it is designed.

These objects I accomplish by means of such structure and relative arrangement of parts as will fully appear from a perusal of the following specification and claims.

In the drawings similar characters of reference indicate corresponding parts in the several views:

Fig. 1 is a side elevation of the cutter.

Fig. 2 is a sectional elevation of the same with the shank broken away.

Fig. 3 is a plan view of the device looking at the face plate.

Fig. 4 is a side elevation of the device showing a modified form of shank or centering means.

Referring now more particularly to the characters of reference on the drawings the numeral 1 denotes a disc-like plate, forming a head, provided with a central hub 2 through which a shank 3 removably projects, this shank being held against movement relative to the head by a set screw 4 or the like. One end of the shank is provided with a square or other non-circular portion 5 to fit a drill chuck or other turning means. The other end of the shank is provided with a centering point 6.

Disposed parallel to the head plate 1, in spaced relation to the same and toward the shank point 6 is a face plate 7, through which the point of the shank projects. This plate is smooth on its outer surface but is provided with an inwardly projecting central hub 8 which has sliding but non-turning clutch engagement with the inner end of the hub 2, as shown at 9.

Screws 10 passed through the head 1 adjustably screw into the plate 7, with compression springs 10$^a$ on the screws between these plates, holding the plate 7 yieldably at its limit of movement away from the plate 1. The amount to which the plates may approach each other with the compression of the springs may be adjustably limited by means of a rod 11 screwed through the plate 1 and approaching the plate 7.

Cutter supports 12 depend from the head 1 toward the plate 7, being mounted for radial sliding movement in the head by slots 13 in the latter into which the supports project. Radial screws 14 mounted in the head are threaded through the supports to enable the same to be adjusted longitudinally of the slots, thus enabling the distance of the cutters from the shank to be easily and independently adjusted. The supports are clamped in any desired position by screws 15 which are threaded into the portions of the supports which project into the slots, the heads of the screws overhanging the sides of the slots.

Cutters 16 abut against the sides of the supports and project snugly through radial slots 17 in the face plate parallel to the slots 13 as shown in Fig. 3. Graduation marks 17$^a$ are placed along the slots 17, on the outside of the plate, so that the cutters may be easily adjusted for different radii of cut. The cutters are removably and adjustably mounted on the supports by screws 18 which pass through slots 19 provided in the supports parallel to the plane of the shank.

In operation the cutters are adjusted to cut to the desired diameter, and are also set so that the inner cutter will engage the blank of material before the outer cutter. The adjusting rod 11 is also set so that the plates can only move together a distance sufficient to cause the cutters to project beyond the face plate the desired distance, which should be but slightly greater than the thickness of the material to be operated on. The blank of material is then laid on a table or the like, preferably wood, and the center point 6 is pressed into the same so that the face plate engages the blank. A downward and rotative pressure is then applied to the shank to cause the entire structure to turn, as well as cutting the cutters to project through the face plate and cut the material. The inner cutter engaging the material first, the center piece will be cut out from the gasket being formed before the gasket itself is disassociated from the blank. There will therefore be no danger of the gasket turning with the face plate while being formed and before its center portion is cut out. The depth to which the cutters can project being controlled by the adjusting rod 11, there need be no possibility of the cutters projecting through the blank a sufficient depth to deeply score the supporting bench or table. The face plate bearing against the blank with the pressure of the springs therebetween, the blank is prevented from wrinkling or pulling out of round while being cut, in the event that the material is of a flexible nature.

If it is desired to cut a hole in a fixed member, such as in the metal sheathing plate 20 of a dashboard 21, as to install an instrument therein, the shank 3 is removed and is replaced by a shank 3ª threaded at one end instead of having the centering point. A relatively small hole is drilled through the dashboard and sheathing to enable the threaded end of the shank to project therethrough. One or more nuts 22 are then threaded onto the shank and abut against the back face of the dashboard. If the nuts are then held from turning and a rotative pressure is applied to the shank 3ª, the head plate will be advanced toward the face plate abutted against the sheathing and the cutters will project from the face plate and engage the sheathing to cut through the same. The sheathing having been cut and the piece removed the wood therebehind may of course be cut to follow the orifice in the metal by means of an ordinary keyhole saw.

In such operations one or the other of the cutters are restricted so as not to engage the work, since a single disc only is to be removed. This threaded shank arrangement may of course also be used in any place suitable and where a relatively great pressure is desired.

It is of course to be understood that cutters of different kinds are necessary for cutting different kinds of material, since it is obvious that a cutter suitable for cutting hard metal would be of a different shape from one used to cut through fibrous and other similar materials.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A gasket cutter comprising a face plate having a centering element, said plate having a radial slot, a cutter to project through the slot, a head spaced from the plate and operatively connected to the plate to rotate therewith, said head having a slot alined with the plate slot, a support to which the cutter is attached slidable along the head slot, and a radial screw passed through the support and mounted in the head to adjust the position of the support lengthwise of the slot.

2. A gasket cutter comprising a face plate having a centering element, said plate having a radial slot, a cutter to project through the slot, a head spaced from the plate and operatively connected to the plate to rotate therewith, said head having a slot alined with the plate slot, a support to which the cutter is attached slidable along the head slot, a radial screw passed through the support and mounted in the head to adjust the position of the support lengthwise of the slot, and means between the support and head for clamping said support in any position to which it may be moved by adjustment of the screw.

3. A gasket cutter including a slotted face plate, a cutter head carrying a cutter to move through the slot in the face plate, means to removably and adjustably connect the face plate to the head and including screws freely movable longitudinally through the head and threaded into the face plate, and means to hold the head and face plate apart.

4. A gasket cutter including the combination of a slotted face plate, a cutter head carrying a cutter to move through the slot in the face plate, guide screws freely movable through the head and fixed to the face plate to maintain proper lateral position between the two while at the same time allowing free relative longitudinal movement thereof and a sliding clutch engagement between the axes of the head and face plate to permit unitary rotation of the two without placing any twisting strain on the guide screws.

In testimony whereof I affix my signature.

JAMES E. MAHIN.